(12) United States Patent
Hoenig et al.

(10) Patent No.: US 6,521,306 B1
(45) Date of Patent: *Feb. 18, 2003

(54) RHEOLOGY MODIFICATION OF LOW DENSITY POLYETHYLENE

(75) Inventors: Wendy D. Hoenig, Lake Jackson, TX (US); Teresa Karjala, Lake Jackson, TX (US); Li-Min Tau, Lake Jackson, TX (US); Clark H. Cummins, Midland, MI (US); Michael J. Mullins, Lake Jackson, TX (US); H. Craig Silvis, Midland, MI (US); Thoi H. Ho, Lake Jackson, TX (US)

(73) Assignee: Dow Global Technologies Inc., Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,163

(22) Filed: Aug. 5, 1998

Related U.S. Application Data

(60) Provisional application No. 60/057,582, filed on Aug. 27, 1997.

(51) Int. Cl.$^7$ .............................................. B29D 22/00

(52) U.S. Cl. ..................... 428/36.8; 428/35.2; 428/35.7; 428/516; 428/517; 524/194

(58) Field of Search .......................... 524/194; 428/35.2, 428/36.8, 36.9, 35.7, 516, 517

(56) References Cited

U.S. PATENT DOCUMENTS

| | | | |
|---|---|---|---|
| 3,058,944 A | 10/1962 | Breslow et al. | 260/41 |
| 3,203,936 A | 8/1965 | Breslow et al. | 260/79.3 |
| 3,203,937 A | 8/1965 | Breslow et al. | 260/79.3 |

(List continued on next page.)

FOREIGN PATENT DOCUMENTS

| | | | |
|---|---|---|---|
| CA | 797917 | 10/1968 | |
| CA | 1024296 | 1/1978 | |
| DE | 1 569 025 | 3/1964 | |
| EP | 0 702 032 A2 | 3/1996 | |
| GB | 2 205 103 A | 11/1988 | |
| JP | 50-133248 | 10/1975 | ........... C08L/23/16 |
| WO | 96/07681 | 3/1996 | |

OTHER PUBLICATIONS

Jacqueline Kroschwitz, Concise Encyclopedia Of Polymer Science And Engineering, John Wiley & Sons, Inc., 1998, pp. 349–362.*

R. A. Abramovitch, "Polar Radicals in Aromatic Substitution", *Intra–Science Chemistry Reports*, pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.*, pp. 2169–2172, (1974).

R. A. Abramovitch, T. Chellathurai, W. D. Holcomb, I. T. McMaster, and D. P. Vanderpool, "Intramolecular Insertion of Arylsulfonylnitrenes into Aliphatic Side Chains[1]", *J. Org. Chem.*, vol. 42, No. 17, pp. 2920–2926, (1977).

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl– and Carbonyl–nitrenes", *J. Chem. Soc., Chem. Commun.*, pp. 1087–1088, (1981).

R. A. Abramovitch, M. Ortiz, and S. P. McManus, "Reaction of Aromatic Sulfonyl Azides with Dienes", *J. Org. Chem.*, vol. 46, pp. 330–335, (1981).

H. Radusch, J. Ding, and M. Schulz, "Chemical coupling of polystyrene and polybutadiene in melt mixtures by using an organic sulfonylazide", *Die Angewandte Makromolekulare Chemie*, vol. 204, pp. 177–189, (1993).

N. Takashima, Y. Nakayama, "The Processings of Crosslinked Plastics", *Kogaku Kogyo* (*Chemical Industry*), pp. 34(378)–39(383), (1969).

D. S. Breslow, M. F. Sloan, N. R. Newburg, and W. B. Renfrow, "Thermal Reactions of Sulfonyl Azides", *J. Amer. Chem. Soc.*, vol. 91, pp. 2273–2279, (1969).

Derwent Chemical Abstract No. 77–02552Y of JP 51134762 A Dialog–Derwent.

P. Mapleston, "PP foam sheet emerges as a contender for a range of applications", *Modern Plastics*, pp. 110–111, (1997).

*Primary Examiner*—Harold Pyon
*Assistant Examiner*—Michael C. Miggins
(74) *Attorney, Agent, or Firm*—Whyte Hirschboeck Dudek SC

(57) ABSTRACT

The invention includes a process of preparing a coupled polymer characterized by heating an admixture containing (1) at least one ethylene polymer or blend of ethylene polymers having a density of at least about 0.89 g/mL and less than about 0.935 g/mL and a comonomer content between about 0.5 and 50 weight percent of an alpha olefin having greater than 2 and less than 20 carbon atoms per molecule and (2) a coupling amount of at least one poly (sulfonyl azide) to at least the decomposition temperature of the poly(sulfonyl azide) for a period sufficient for decomposition of at least about 80 weight percent of the poly (sulfonyl azide) and sufficient to result in a coupled polymer. The amount of poly(sulfonyl azide) is preferably from about 0.01 to about 5 weight percent of polymers in the admixture. The invention also includes any composition which is the product of any of the processes of the invention and articles made from those compositions, particularly any film of any composition of the invention. Additionally the invention includes a use of any composition of the invention in a process of blowing, casting or calendaring a film. More particularly the invention includes articles of compositions of the invention which are trash bags, agricultural films, construction films, or geomembranes, grocery sacks, sealant layers, tie layers, produce bags, garment bags, shipping sacks, medical films, stretch films, shrink films, agricultural films, greenhouse films, construction films, or stretch hooders.

8 Claims, No Drawings

U.S. PATENT DOCUMENTS

| | | | |
|---|---|---|---|
| 3,282,864 A | 11/1966 | Best et al. | 260/2.5 |
| 3,298,975 A * | 1/1967 | Field et al. | 260/2.5 |
| 3,336,268 A | 8/1967 | Cox | 260/79.3 |
| 3,341,480 A | 9/1967 | Feild et al. | 260/2.5 |
| 3,389,198 A | 6/1968 | Taber | 264/52 |
| 3,530,108 A | 9/1970 | Oppenlander et al. | 260/93.7 |
| 4,352,892 A | 10/1982 | Lohmar | 521/79 |
| 4,579,905 A | 4/1986 | Krabbenhoft | 525/63 |
| 4,694,025 A | 9/1987 | Park | 521/88 |
| 4,714,716 A | 12/1987 | Park | 521/80 |
| 5,037,895 A | 8/1991 | Marker et al. | 525/351 |
| 5,118,531 A | 6/1992 | Petersen et al. | 427/230 |

* cited by examiner

RHEOLOGY MODIFICATION OF LOW DENSITY POLYETHYLENE

This application claims the benefit of U.S. Provisional Application No. 60/057,582, filed Aug. 27, 1997 which is hereby incorporated by reference herein in its entirety.

This invention relates to coupling of polyolefins, more specifically coupling of polyolefins to form products suitable for films.

As used herein, the term "rheology modification" means change in melt viscosity of a polymer as determined by dynamic mechanical spectroscopy. Preferably the melt strength increases while maintaining the high shear viscosity (that is viscosity measured at a shear of 100 rad/sec by DMS) so that a polymer exhibits more resistance to stretching during elongation of molten polymer at low shear conditions (that is viscosity measured at a shear of 0.1 rad/sec by DMS) and does not sacrifice the output at high shear conditions. An increase in melt strength is typically observed when long chain branches or similar structures are introduced into a polymer.

Polyolefins are frequently rheology modified using non-selective chemistries involving free radicals generated for instance using peroxides or high energy radiation. However, chemistries involving free radical generation at elevated temperatures also degrade the molecular weight, especially in polymers containing tertiary hydrogen such as polystyrene, polypropylene, polyethylene copolymers etc. The reaction of polypropylene with peroxides and pentaerythritol triacrylate is reported by Wang et al., in Journal of Applied Polymer Science, Vol. 61, 1395–1404 (1996). They teach that rheology modification of isotactic polypropylene can be realized by free radical grafting of di- and tri-vinyl compounds onto polypropylene. However, this approach does not work well in actual practice as the higher rate of chain scission tends to dominate the limited amount of chain coupling that takes place. This occurs because chain scission is an intra-molecular process following first order kinetics, while coupling is an inter-molecular process with kinetics that are minimally second order. Chain scission results in lower molecular weight and higher melt flow rate than would be observed were the branching not accompanied by scission. Because scission is not uniform, molecular weight distribution increases as lower molecular weight polymer chains referred to in the art as "tails" are formed.

The teachings of U.S. Pat. Nos. 3,058,944; 3,336,268; and 3,530,108 include the reaction of certain poly(sulfonyl azide) compounds with isotactic polypropylene or other polyolefins by nitrene insertion into C—H bonds. The product reported in U.S. Pat. No. 3,058,944 is crosslinked. The product reported in U.S. Pat. No. 3,530,108 is foamed and cured with cycloalkane-di(sulfonyl azide) of a given formula. In U.S. Pat. No. 3,336,268 the resulting reaction products are referred to as "bridged polymers" because polymer chains are "bridged" with sulfonamide bridges. The disclosed process includes a mixing step such as milling or mixing of the sulfonylazide and polymer in solution or dispersion then a heating step where the temperature is sufficient to decompose the sulfonylazide (100° C. to 225° depending on the azide decomposition temperature). The starting polypropylene polymer for the claimed process has a molecular weight of at least about 275,000. Blends taught in U.S. Pat. No. 3,336,268 have up to about 25 percent ethylene propylene elastomer.

U.S. Pat. No. 3,631,182 taught the use of azido formate for crosslinking polyolefins. U.S. Pat. No. 3,341,418 taught the use of sulfonyl azide and azidoformate compounds to crosslink of thermoplastics material(PP (polypropylene), PS (polystyrene), PVC (poly(vinyl chloride)) and their blends with rubbers (polyisobutene, EPM, etc.).

Similarly, the teachings of Canadian patent 797,917 (family member of NL 6,503,188) include rheology modification using from about 0.001 to 0.075 weight percent poly(sulfonyl azide) to modify homopolymer polyethylene and its blends with, especially polyisobutylene. The polyethylene is referred to as linear polyethylene. Polyethylene having a density of about 0.945 is exemplified. The product is said to be useful for thermoforming.

It would be desirable to have polymers rheology modified rather than crosslinked (that is having less than about 10 percent gel as determined by xylene extraction specifically by ASTM 2765). In the case of medium and lower density polyethylene (that is polymers having a density of from about 0.94 g/cc to about 0.90 g/cc), which are advantageously copolymers of ethylene in which the percent comonomer is preferably about 0.5 to 5 mole percent comonomer based on total polymer as determined by ASTM 5017, the polymers would desirably show a combination of processability improved over the starting material with retention or improvement of toughness, low heat seal initiation temperature, low haze, high gloss or hot tack properties characteristic of the starting material.

Currently, thick films (films having a thickness greater than about 6 mil, that is 15×10E-02 mmeters) are often formed from low density polyethylene (LDPE) because of its processability in the area of bubble stability and melt strength. Desired higher toughness is obtained by blending the LDPE with linear low density polyethylene (LLDPE), but the LLDPE lowers processability (that is, it raises extruder pressures resulting in the reduction of the output and reduces the melt strength). Melt strength is, however, necessary to form a bubble. It would be desirable to achieve higher toughness than is obtained with LDPE alone, preferably at least the toughness attained using LDPE/LLDPE blends having up to about thirty weight percent LLDPE with desirable bubble stability or melt strength, preferably both, at least as great as that of the starting material LDPE alone. Mechanical properties are Elmendorf tear strength (for instance as measured according to the procedures of ASTM D1922); tensile properties (for instance as measured using the procedures of ASTM D638); and toughness which is conveniently measured by puncture, for instance using a testing frame commercially available from Sintech, Inc. under the trade designation MTS Sintech RE New which is an Instron Model 4201 with Sintech Hardware Upgrade using Sintech Testing Software; and melt strength as indicated by low shear (0.1 rad/sec) viscosity.

Thick polyethylene films are useful for instance as greenhouse films, mulch films, agricultural films and the like.

SUMMARY OF THE INVENTION

The invention includes a process of preparing a coupled polymer characterized by heating an admixture containing (1) at least one ethylene polymer or blend of ethylene polymers having a density of at least about 0.89 g/mL and less than about 0.935 g/mL and a comonomer content between about 0.5 and 50 weight percent of an alpha olefin having greater than 2 and less than 20 carbon atoms per molecule and (2) a coupling amount of at least one poly (sulfonyl azide) to at least the decomposition temperature of the poly(sulfonyl azide) for a period sufficient for decomposition of at least about 80 weight percent of the poly (sulfonyl azide) and sufficient to result in a coupled polymer. The amount of poly(sulfonyl azide) is preferably from about 0.01 to about 5 weight percent of polymers in the admixture. The invention also includes any composition which is the product of any of the processes of the invention and articles made from those compositions, particularly any film of any composition of the invention. Additionally the invention includes a use of any composition of the invention in a process of blowing or calendaring a film. More particularly the invention includes articles of compositions of the invention which are trash bags, agricultural films, construction films, or geomembranes, grocery sacks, sealant layers, tie layers, produce bags, garment bags, shipping sacks, medical films, stretch films, shrink films, agricultural films, construction films, or stretch hooders.

DETAILED DESCRIPTION OF THE INVENTION

Polymers to which the practice of this invention is applicable include homopolymers and copolymers of ethylene (hereinafter ethylene polymers) with narrow and broad (including bimodal) molecular weight distribution. One type of preferred polymers for use in the practice of the invention are polymers prepared from ethylene in combination with other monomers polymerizable therewith. Such monomers include alpha olefins and other monomers having at least one double bond, preferably alpha olefins having greater than 2, more preferably greater than 5 carbons. These polymers differ from linear polyethylene in that they have short chain branches introduced by the comonomers, for instance branches of R introduced by a monomer of structure $RCH=CH_2$. Another type of preferred polymer has long chain branches introduced in the polymerization thereof as discussed hereinafter. Although these ethylene polymers have long or short branches and therefore differ from the linearity of (high density) polyethylene homopolymer, some are referred to in the art as "LLDPE" or linear low density polyethylene or "SLEP" substantially linear ethylene polymers where the term "linear" came to be used historically to distinguish from earlier highly branched low density polyethylenes prepared using free radical polymerization.

Advantageously for practice of the present invention, such ethylene polymers having long chain branches, have low density, that is preferably a density less than about 0.935 g/mL, more preferably less than about 0.93 g/mL, most preferably less than about 0.92 g/mL. Preferably the density (as measured according to ASTM D-792) is at least about 0.89 g/mL, more preferably at least about 0.890 g/mL, most preferably at least about 0.91 g/mL. It is understood by those skilled in the art that a blend of ethylene polymers, particularly a blend formed in a polymerization reactor (in reactor blend) is sometimes perceived as or referred to as an ethylene polymer. In such an instance, the properties of the blend rather than those of the individual components are referred to as those of the ethylene polymer. For instance, an ethylene polymer can be a bimodal blend of ethylene polymer components and have a density between 0.89 and 0.935 g/mL even though one or both of the components might have a density outside that range. The bimodal blend would, however, be considered to be preferred for the practice of this invention.

Alpha olefins having more than 2 carbon atoms include propylene, 1-butene, 1-pentene, 1-hexene, 1-octene, 1-nonene, 1-decene, 1-unidecene, 1-dodecene and the like as well as 4-methyl-1-pentene, 4-methyl -1-hexene, 5-methyl-1-hexene, vinylcyclohexene, and the like.

The ethylene polymers which may be rheology modified according to this invention may be any interpolymers of ethylene and at least one α-olefin. Suitable α-olefins are represented by the following formula:

in which R is a hydrocarbyl radical. R generally has from one to twenty carbon atoms. Suitable α-olefins for use as comonomers in a solution, gas phase or slurry polymerization process or combinations thereof include 1-propylene, 1-butene, 1-isobutylene, 1-pentene, 1-hexene, 4-methyl-1-pentene, 1-heptene and 1-octene, as well as other monomer types such as tetrafluoroethylene, vinyl benzocyclobutane, and cycloalkenes, e.g. cyclopentene, cyclohexene, and cyclooctene. Preferably, the α-olefin will be 1-butene, 1-pentene, 4-methyl-1-pentene, 1-hexene, 1-heptene, 1-octene, or mixtures thereof. More preferably, the α-olefin will be 1-hexene, 1-heptene, 1-octene, or mixtures thereof. Most preferably, the α-olefin will be 1-octene. The ethylene polymer rheology modified according to this invention is preferably a SLEP, that is a substantially linear ethylene polymer, defined hereinafter.

The polyolefin is a homopolymer, copolymer, or interpolymer. Preferably the homo or copolymers contain ethylene repeating units. In polyethylene copolymers or interpolymers, the comonomer content is greater than about 1 weight percent as determined by $^{13}C$ NMR (carbon 13 nuclear magnetic resonance), preferably greater than about 2, more preferably greater than about 3, most preferably at least about 5 weight percent of alpha olefin or cyclic olefin. Preferably such an olefin of less than about 20 carbon atoms, more preferably from about 2 to about 18 carbon atoms, most preferably greater than about 5 carbon atoms. The comonomer content is at least one comonomer polymerizable with ethylene, preferably less than about 4 comonomers polymerizable with ethylene, more preferably less than 2 such comonomers.

Polyolefins are formed by means within the skill in the art. The alpha olefin monomers and optionally other addition polymerizable monomers are polymerized under conditions within the skill in the art, Such conditions include those utilized in processes involving Ziegler-Natta catalysts such as those disclosed in U.S. Pat. No. 4,076,698 (Anderson et al); U.S. Pat. No. 4,950,541 and the patents to which they refer, as well as U.S. Pat. No. 3,645,992 (Elston) as well as those processes utilizing metallocene and other single site catalysts such as exemplified by U.S. Pat. No. 4,937,299 (Ewen et al.), U.S. Pat. No. 5,218,071 (Tsutsui et al.), U.S. Pat. Nos. 5,278,272, 5,324,800, 5,084,534, 5,405,922, 4,588,794, 5,204,419 and the processes subsequently discussed in more detail.

In one embodiment, starting material polyolefins are preferably substantially linear ethylene polymers (SLEPs). The substantially linear ethylene polymers (SLEPs) are homogeneous polymers having long chain branching. They are disclosed in U.S. Pat. Nos. 5,272,236 and 5,278,272, the disclosures of which are incorporated herein by reference. SLEPs are available as polymers made by the Insite™ Process and Catalyst Technology such as Engage™ polyolefin elastomers (POEs) commercially available from DuPont Dow Elastomers LLC and Affinity™ polyolefin plastomers (POPs) commercially available from The Dow Chemical Company. Specific examples of useful POPs include those having the trade designation Affinity™ with a numerical trade designation of FM-1570, HM 1100, SM 1300, and PL 1880 each of which is commercially available from The Dow Chemical Company. SLEPs can be prepared via the solution, slurry, or gas phase, preferably solution phase, polymerization of ethylene and one or more optional α-olefin comonomers in the presence of a constrained geometry catalyst, such as is disclosed in European Patent Application 416,815-B, incorporated herein by reference.

The substantially linear ethylene/α-olefin polymers are made by a continuous process using suitable constrained geometry catalysts, preferably constrained geometry catalysts as disclosed in U.S. Pat. No. 5,132,380 and Application Ser. No.: 545,403, filed Jul. 3, 1990; the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

The expression "continuous process" means a process in which reactants are continuously added and product is continuously withdrawn such that an approximation of a steady state (i.e. substantially constant concentration of reactants and product while carrying out the process) is achieved. The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers to be rheologically modified according to the present invention, such as those disclosed in U.S. Pat. No. 3,914,342, incorporated herein by reference. The multiple reactors can be operated in series or in parallel, with at least one constrained geometry catalyst employed in one of the reactors.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

In contrast to the term "substantially linear", the term "linear" means that the polymer lacks measurable or demonstrable long chain branches, i.e., the polymer is substituted with an average of less than 0.01 long chain branch/1000 carbons.

For ethylene/α-olefin interpolymers, "long chain branching" (LCB) means a chain length longer than the short chain branch that results from the incorporation of the α-olefin(s) into the polymer backbone. Each long chain branch has the same comonomer distribution as the polymer backbone and can be as long as the polymer backbone to which it is attached.

The empirical effect of the presence of long chain branching in the substantial linear ethylene/α-olefin interpolymers used in the invention is manifested in its enhanced rheological properties which are quantified and expressed herein in terms of gas extrusion rheometry (GER) results and/or melt flow, $I_{10}/I_2$, increases.

The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C.29, V. 2&3, p. 285–297), the disclosure of which is incorporated herein by reference.

As a practical matter, current $^{13}C$ nuclear magnetic resonance spectroscopy cannot distinguish the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J.Chem. Phys., 17,1301 (1949) and Rudin, A., *Modern Methods of Polymer Characterization*, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Miss., presented data demonstrating that GPC-DV is a useful technique for quantifying the presence of long chain branches in SLEPs. In particular, deGroot and Chum found that the level of long chain branches in homogeneous substantially linear homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$) as a function of Log ($M_w$) as determined by GPC illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

SLEPs are further characterized as having:
(a) a melt flow ratio, $I_{10}/I_2 \geq 5.63$,
(b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, the linear ethylene polymer has an $I_2$, $M_w/M_n$ and, preferably density, which are each within ten percent of the SLEP and wherein the respective critical shear rates of the SLEP and the linear ethylene polymer are measured at the same melt temperature using a gas extrusion rheometer, and, preferably (d) a single differential scanning calorimetry, DSC, melting peak between −30 and 150 C.

For the substantially linear ethylene/a-olefin polymers used in the compositions of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25.

The melt index as measured by ASTM D-12338 (190° C./2.16 kg) for the substantially linear olefin polymers useful herein is preferably at least about 0.1 grams/10 minutes (g/10 min), more preferably at least about 0.5 g/10 min and especially at least about 1 g/10 min up to preferably about 100 g/10 min, more preferably up to about 50 g/10 min, and especially up to about 20 g/10 min.

Determination of the critical shear rate and critical shear stress in regards to melt fracture as well as other rheology properties such as theological processing index (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in *Rheometers for Molten Plastics* by John Dealy, published by Van Nostrand Reinhold Co. (1982) on pp. 97–99, both of which are incorporated by reference herein in their entirety. GER experiments are generally performed at a temperature of 190C., at nitrogen pressures between 250 to 5500 psig using a 0.0754 mm diameter, 20:1 L/D die with an entrance angle of 180°. For the SLEPs described herein, the PI is the apparent viscosity (in kpoise) of a material measured by GER at an apparent shear stress of $2.15 \times 10^6$ dyne/cm². The SLEPs for use in the invention includes ethylene interpolymers and have a PI in the range of 0.01 kpoise to 50 kpoise, preferably 15 kpoise or less. The SLEPs used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the SLEPs.

The Theological behavior of SLEPs can also be characterized by the Dow Rheology Index (DRI), which expresses a polymer's "normalized relaxation time as the result of long chain branching." (See, S. Lai and G. W. Knight *ANTEC '93 Proceedinqs*, INSITE™ Technology Polyolefins (SLEP)— New Rules in the Structure/Rheology Relationship of Ethylene α-Olefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exacts™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the SLEPs useful in this invention, DRI is preferably at least 0.1, and especially at least 0.5, and most especially at least 0.8. DRI can be calculated from the equation:

$$DRI = (3652879 * \tau_o^{1.00649}/\eta_o - 1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e., $$\eta/\eta_o = 1/(1 + (\gamma \cdot \tau_o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 190 C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190 C. Specific material determinations can be performed from 140 to 190 C. as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30 (2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is defined as the loss of extrudate gloss. The loss of extrudate gloss is the point at which the surface roughness of the extrudate can only be detected by a 40X magnification. The critical shear rate at the onset of surface melt fracture for the SLEPs is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the SLEPs, especially those having a density >0.910 g/cc, used in the invention is greater than $4 \times 10^6$ dynes/cm². The critical shear rate at the onset of surface melt fracture (OSMF) and the onset of gross melt fracture (OGMF) will be used herein based on the changes of surface roughness and configurations of the extrudates extruded by a GER.

The SLEPs used in the invention are also preferably characterized by a single DSC melting peak. The single melting peak is determined using a differential scanning calorimeter standardized with indium and deionized water. The method involves 3–7 mg sample sizes, a "first heat" to about 180 C. which is held for 4 minutes, a cool down at 10 C./min. to −30 C. which is held for 3 minutes, and heat up at 10 C./min. to 140 C. for the "second heat". The single melting peak is taken from the "second heat" heat flow vs.

temperature curve. Total heat of fusion of the polymer is calculated from the area under the curve.

For polymers having a density of 0.875 g/cc to 0.910 g/cc, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

The molecular weight distributions of ethylene α-olefin polymers are determined by gel permeation chromatography (GPC) on a Waters 150 C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å ($10^{-4}$, $10^{-3}$, $10^{-2}$ and $10^{-1}$ mm). The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_j = (\Sigma w_i (M_i^j))^j$; where $w_i$ is the weight fraction of the molecules with molecular weight $M_i$ eluting from the GPC column in fraction i and j=1 when calculating $M_w$, and j=-1 when calculating $M_n$.

For the purposes of rheology modification or coupling, the polymer is reacted with a polyfunctional compound capable of insertion reactions into C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; *Tetrahedron*, (1985), 41(8), pages 1509–1516, and nitrenes as generated from azides, as cited in Abramovitch, R. A.,; Chellathurai, T.; Holcomb, W. D; McMaster, I. T.; and Vanderpool, D. P.; *J. Org. Chem.*, (1977), 42(17), 2920–6, and Abramovitch, R. A., Knaus, G. N., *J. Org. Chem.*, (1975), 40(7), 883–9.

Compounds having at least two functional groups capable of C—H insertion under reaction conditions are referred to herein as coupling agents. Such coupling agents include alkyl and aryl azides (R—$N_3$), acyl azides (R—C(O)$N_3$), azidoformates (R—O—C(O)—$N_3$), phosphoryl azides ((RO)$_2$—(PO)—$N_3$), phosphinic azides (R$_2$—P(O)—$N_3$) and silyl azides (R$_3$—Si—$N_3$).

Polyfunctional compounds capable of insertions into C—H bonds also include poly(sulfonyl azide)s. The poly (sulfonyl azide) is any compound having at least two sulfonyl azide groups (—SO$_2$$N_3$) reactive with the polyolefin. Preferably the poly(sulfonyl azide)s have a structure X—R—X wherein each X is SO$_2$$N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1, 5-pentane bis(sulfonyl azide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides (R—$N_3$), acyl azides (R—C(O)$N_3$), azidoformates (R—O—C(O)—$N_3$), sulfonyl azides (R—SO$_2$—$N_3$), phosphoryl azides ((RO)$_2$—(PO) —N) , phosphinic azides (R$_2$—P (O)—$N_3$) and silyl azides (R$_3$—Si—$N_3$). Some of the coupling agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred coupling agents is conveniently possible because of the differences in the temperatures at which the different classes of coupling agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the coupling agent adequately dispersed and located substantially in the desired position in the final product. Such location and dispersion may be different from product to product depending on the desired properties of the final product.) Phosphoryl azides may be reacted at temperatures in excess of 180° C. up to about 300° C., while silyl azides react preferentially at temperatures of from about 250° C. to 400° C.

To modify rheology, also referred to herein as "to couple," the poly(sulfonyl azide) is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in less than 1 weight percent of gel as measured by ASTM D2765-procedure A. While those skilled in the art will recognize that the amount of azide sufficient to increase the low shear viscosity and result in less than about 1 weight percent gel will depend on molecular weight of the azide used and polymer, the amount is preferably less than about 5 percent, more preferably less than about 2 percent, most preferably less than about 1 weight percent poly(sulfonyl azide) based on total weight of polymer when the poly(sulfonyl azide) has a molecular weight of from about 200 to about 2000. To achieve measurable rheology modification, the amount of poly(sulfonyl azide) is preferably at least about 0.01 weight percent, more preferably at least about 0.05 weight percent, most preferably at least about 0.10 weight percent based on total polymer.

For rheology modification, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide) begins to react at a kinetically significant rate (convenient for use in the practice of the invention) at temperatures of about 130° C. and is almost completely reacted at about 160° C. in a DSC (scanning at 10° C./min). ARC (scanning at 2° C./hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what rheological properties are to be modified. In a homopolymer or copolymer it is desirable to have as homogeneous a distribution as possible, preferably achieving solubility of the azide in the polymer melt.

Preferred processes include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion, pelletizing, film blowing and casting, thermoforming, compounding in polymer melt form, and the like.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention either higher at low angular frequency (e.g. 0.1 rad/sec) or lower at higher angular frequency (e.g. 100 rad/sec) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeniety rather than localized concentrations at the surface.

Any equipment is suitably used, preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment the process of the present invention takes place in a single vessel, that is mixing of the coupling agent and polymer takes place in the same vessel as heating to the decomposition temperature of the coupling agent. The vessel is preferably a twin-screw extruder, but is also advantageously a single-screw extruder or a batch mixer. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture.

For polymers that have softening points above the coupling agent decomposition temperature (preferably greater than 200° C.), and especially when incorporation of a lower melting polymer (such as in a concentrate) is undesirable, the preferred embodiment for incorporation of coupling agent is to solution blend the coupling agent in solution or admixture into the polymer, to allow the polymer to imbibe (absorb or adsorb at least some of the coupling agent), and then to evaporate the solvent. After evaporation, the resulting mixture is extruded. The solvent is preferably a solvent for the coupling agent, and more preferably also for the polymer when the polymer is soluble such as in the case of polycarbonate. Such solvents include polar solvents such as acetone, THF (tetrahydrofuran) and chlorinated hydrocarbons such as methylene chloride. Alternatively other non-polar compounds such as mineral oils in which the coupling agent is sufficiently miscible to disperse the coupling agent in a polymer, are used.

To avoid the extra step and resultant cost of re-extrusion and to insure that the coupling agent is well blended into the polymer, in alternative preferred embodiments it is preferred that the coupling agent be added to the post-reactor area of a polymer processing plant. For example, in a slurry process of producing polyethylene, the coupling agent is added in either powder or liquid form to the powdered polyethylene after the solvent is removed by decantation and prior to the drying and densification extrusion process. In an alternative embodiment, when polymers are prepared, in a gas phase process, the coupling agent is preferably added in either powder or liquid form to the powdered polyethylene before the densification extrusion. In an alternative embodiment when a polymer is made in a solution process, the coupling agent is preferably added to the polymer solution prior to the densification extrusion process.

Practice of the process of the invention to rheology modify polymers yields rheology modified or chain coupled polymers, that is the polymers which have sulfonamide, amine, alkyl-substituted or aryl-substituted carboxamide, alkyl-substituted or aryl-substituted phosphoramide, alkyl-substituted or aryl-substituted methylene coupling between different polymer chains. Resulting compounds advantageously show higher low shear viscosity than the original polymer due to coupling of long polymer chains to polymer backbones. Broad molecular weight distribution polymers (polydispersity (P.D.) of 3.5 and greater) and gel levels less than 10 percent as determined by xylene extraction show less improvement than the dramatic effect noted in narrow MWD polymer (P.D.=2.0) with gel less than 10 percent as determined by xylene extraction.

Rheology modification leads to polymers which have controlled rheological properties, specifically improved melt strength as evidenced by increased low shear viscosity, better ability to hold oil, higher orientation in high shear and high extensional processes such as film extrusion (blown and cast) and calendaring, melt elasticity as measured by tan delta as measured by viscosity at 0.1 rad/sec and 100 rad/sec, respectively. It is also believed that this process can be used to produce dispersions having improved properties of higher low shear viscosity than the unmodified polymer as measured by DMS.

Rheology modified polymers are especially useful as blown film for better bubble stability as measured by low shear viscosity.

Polymers rheology modified according to the practice of the invention are superior to the corresponding unmodified polymer starting materials for these applications due to the elevation of viscosity, of preferably at least about 5 percent at low shear rates (0.1 rad/sec), sufficiently high melt strengths to avoid deformation during thermal processing or to achieve bubble strength during blow molding, and sufficiently low high shear rate viscosities to facilitate molding and extrusion. Advantageously toughness and tensile strength of the starting material is maintained or improved.

Polymers resulting from the practice of the invention are different from those resulting from practice of prior art processes such as shown in CA 797,917. At least one mechanical property of tear strength, puncture resistance or low haze (as measured by ASTM D1003) a film prepared from a composition of the invention is superior to that of a film of the linear polyethylene modified as taught in CA 797,917. A film made from the material taught in the reference would have a puncture resistance of less than about 15 in-lb (17.25 cm/kg), machine direction Elmendorf tear strength of less than about 500 g, and haze of more than about 35 percent. The puncture resistance is measured at room temperature using an instrument for the purpose available from Instron Inc. under the trade designation Model 4201 with a hardware upgrade commercially available from Sintech Inc. under the trade designation MTS Sintech ReNew testing frame with the Sintech (Version 3.08) Testing Software, film with dimensions of 6"×6" (15 cm×15 cm), a round specimen holder measuring 12.56" square (78.5 cm$^2$), a puncture probe of polished stainless steel ball measuring ½" (1.25 cm), with 7.5" (18.75 cm) maximum travel and travel speed of 10"/min (25.4 cm/min), to measure the energy required to break the film.

Film and film structures particularly benefit from this invention and can be made using conventional blown film fabrication techniques or other, preferably biaxial, orientation processes such as tenter frames or double bubble processes. Conventional blown film processes are described, for example, in *The Encyclopedia of Chemical Technology*, Kirk-Othmer, Third Edition, John Wiley & Sons, New York, 1981, vol. 16, pp. 416–417 and Vol. 18, pp. 191–192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compositions described herein. The film structures can also be made as described in a tenter-frame technique, such as that used for oriented polypropylene.

Other multi-layer film manufacturing techniques for food packaging applications are described in *Packaging Foods With Plastics*, by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by the TAPPI Press (1992)).

The films may be monolayer or multilayer films. The film made using this invention can also be coextruded with the other layer(s) or the film can be laminated onto another layer(s) in a secondary operation, such as that described in *Packaging Foods With Plastics,* by Wilmer A. Jenkins and James P. Harrington (1991) or that described in "Coextrusion For Barrier Packaging" by W. J. Schrenk and C. R. Finch, *Society of Plastics Engineers RETEC Proceedings*, Jun. 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to 7 layers.

The rheology-modified polymers and intermediates used to make rheology-modified polymers may be used alone or in combination with one or more additional polymers in a polymer blend. When additional polymers are present, they may be selected from any of the modified or unmodified homogeneous polymers described above for this invention and/or any modified or unmodified heterogeneous polymers.

It has been found that compositions of the invention are particularly useful in thick films such as are particularly useful in agricultural films, e.g. useful as mulch, greenhouse films, and geomembranes. The term "thick films" is used to designate films having a thickness greater than about 6 mils (greater than about 15×10E-02 mmeters). Such films are preferably prepared by blown film processes within the skill in the art. In these processes compositions of the invention are preferably capable of blow up ratios (ratio of square area of bubble to square area of die diameter) of at least about 2, more preferably at least about 2.5 with an adequate melt strength to produce a stable bubble at an extruder pressure less than about 2000 psi (13,784 kPa). The starting material ethylene polymer preferably has a density less than about 0.935, more preferably up to about 0.930, most preferably up to about 0.920; and preferably at least about 0.89, more preferably at least about 0.890, most preferably at least about 0.900. The polymer modified according to the practice of the invention preferably has an I2 as measured by the procedures of ASTM 1238 Procedure A at 190° C. and 2.16 Kg of less than about 5 g/10 min, more preferably less than about 1 g/10 min to avoid an unstable bubble which results when the melt index is too high.

Heterogeneous polyethylenes that are optionally combined with the rheology-modified polymers according to this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities (according to ASTM D-792) of these linear polymers advantageously range from about 0.87 to 0.91 g/cc.

Both the materials made by the free radical catalysts and by the coordination catalysts are well known in the art, as are their methods of preparation. Heterogeneous linear ethylene polymers are available from The Dow Chemical Company as Dowlex™ LLDPE and as Attane™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. 4,950,541 and the patents to which it refers, all of which are incorporated herein by reference.

Compositions of the invention and compositions produced by practice of the invention are particularly useful because of their surprising properties. For instance the preferred medium density polyethylenes and ethylene copolymers (density about 0.90 g/mL, comonomer content 0.5–5 mole percent) of the invention are particularly useful as blown films such as in trash bags, grocery sacks, sealant layers, tie layers, produce bags, garment bags, shipping sacks, medical films, stretch film, shrink film, agricultural film, construction film, geomembranes, stretch hooders, green house films, mulch films, and the like, preferably trash bags, agricultural film, greenhouse film, construction film, and geomembranes. Similarly the medium density preferred embodiments are useful in cast films such as are useful in stretch films, diaper backsheets, industrial wrap, produce wrap, meat wrap, consumer wrap, shrink film elastic film and the like, preferably as elastic film. The low density preferred embodiments are also particularly useful for calendaring to form such materials as sheeting, packaging films, and non-packaging films.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

Test Methods

A Rheometrics, Inc. RMS-800 dynamic mechanical spectrometer with 25 mm diameter parallel plates was used to determine the dynamic rheological data. A frequency sweep with five logarithmically spaced points per decade was run from 0.1 to 100 rad/s at 190° C. The strain was determined to be within the linear viscoelastic regime by performing a strain sweep at 0.1 rad/s and 190° C., by strain sweep from 2 to 30 percent strain in 2 percent steps to determine the minimum required strain to produce torques within the specification of the transducer; another strain sweep at 100 rad/s and 190° C. was used to determine the maximum strain before nonlinearity occurred according to the procedure disclosed by J. M. Dealy and K. F. Wissbrun, "Melt Rheology and Its Role in Plastics Processing", Van Nostrand, N.Y. (1990). All testing was performed in a nitrogen purge to minimize oxidative degradation.

The melt index was measured according to ASTM D-1238 condition 190° C./2.16 Kg(formerly known as Condition E).

Xylene Extraction was performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent extracted=(initial weight-final weight)/initial weight according to ASTM D-2765 Procedure "A".

Samples were prepared using either a HaakeBuchler Rheomix 600 mixer with roller style blades, attached to a HaakeBuchler Rheocord 9000 Torque rheometer, or using a Brabender mixer (Type R.E.E. No. A-19/S.B) with a 50 g mixing bowl.

All instruments were used according to manufacturer's directions unless designated otherwise.

EXAMPLES 1 AND 2 AND COMPARATIVE SAMPLE A

A 43 g samples of an ethylene-octene (6 mole percent octene, estimate based on equation from Kale et al in *Journal of Plastic Film and Sheeting*, vol. 12, January 1996, pp. 27–40) substantially linear homogeneous copolymer with Mw/Mn=2.19 and Mw=93,600, 1 melt index (MI), density 0.903 g/cc commercially available from The Dow Chemical Company under the trade designation AFFINITY PL 1880 polymer was mixed in a Haake mixer. The polymer has about 500 ppm of a hindered polyphenol antioxidant commercially available from Ciba Geigy Corporation under the trade designation Irganox 1076 and 800 ppm of an antioxidant believed to be tetrakis-(2,4-ditetitiary butylphenol)4,4'-biphenyl phosphonite commercially available from Sandoz Chemical Company under the trade designation P-EPQ. The polymer was melted at 100° C. for 2 minutes until all pellets were molten. Then 0.05 weight percent of 4,4'-oxybis(benzenesulfonyl azide) CAS# [7456-68-0] was mixed into the molten polymer for 2 minutes. After intimate mixing was achieved, the temperature was adjusted to 170° C. and the rotational speed was increased from 20 to 40 rpm over a period of 7 minutes to reach a maximum of 180° C. The mixture is held at this higher temperature and high rotational speed for 12 minutes, and then it was cooled to 150° C. The sample was removed from the Haake and allowed to cool to room temperature.

For Example 2, the procedure of Example 1 was repeated but using 0.1 weight percent 4,4'-oxybis(benzenesulfonyl azide).

Rheological properties (viscosity and tan delta) were measured for each sample plus an unmodified control (Comparative Sample A) at 190° C. over a frequency range of 0.1 to 100 rad/second using a Rheometrics mechanical spectrometer equipped with parallel 25 mm diameter plates according to manufacture's directions. The low shear viscosity is the viscosity measured at the lowest frequency. The high shear viscosity was determined NSC at 100 rad/sec.

The results of these tests are in Table 1.

EXAMPLES 3 AND 4 AND COMPARATIVE SAMPLE B

The procedure of Example 1 is repeated using an 6.6 mole percent comonomer ethylene-butene homogeneous linear copolymer with Mw/Mn=1.9 and Mw=118,600 MI=1.2, density 0.9021, melt flow 1.20 g/10 min at 109° C., melting temperature 197.6° F. commercially available from Exxon Chemical Company under the trade designation EXACT 3028, using 0.05 weight percent of 4,4'-oxybis (benzenesulfonyl azide) CAS# [7456-68-0] for Example 3, 0.1 weight percent for Example 4 and no poly(sulfonyl azide) for Comparative Samples B.

EXAMPLES 5 AND 6 AND COMPARATIVE SAMPLE C

The procedure of Example 1 is repeated using a linear low density ethylene/octene copolymer (2.5 mole percent octene, estimated based on equation from Kale et al as in Example 1) with Mw/Mn=3.96, Mw=114,800 $I_2$=1.0 g/10 minutes and density of 0.92 g/cm$^3$ commercially available from The Dow Chemical Company under the trade designation Dowlex 2045 containing 1250 ppm calcium stearate, 200 ppm hindered polyphenol antioxidant commercially available from Ciba Geigy Corporation under the trade designation Irganox 1010 with 0, 0.05, and 0.1 weight percent of 4,4'-oxybis(benzenesulfonyl azide) CAS# [7456-68-0] for C.S. C, Example 5, and Example 6, respectively.

EXAMPLES 7 AND 8 AND COMPARATIVE SAMPLE D

The procedure of Example 1 is repeated using an ethylene-octene copolymer with melt index of 0.85 g/10 min (by ASTM D1238), density 0.920 g/cc (by ASTM D 792), Mw/Mn=3.45 and Mw=130,300, commercially available from The Dow Chemical Company under the trade designation Elite 5100 (containing 1250 ppm calcium stearate, 500 ppm Irganox 1076 antioxidant, and 800 ppm P-EPQ antioxidant) with 0, 0.05, and 0.1 weight percent of 4,4'-oxybis(benzenesulfonyl azide) CAS# [7456-68-0] for C.S. D, Example 7, and Example 8, respectively.

TABLE 1

| | Visc 0.1 poise | Visc 100 poise | Visc 0.1/100 | Tan 0.1 | % Visc 0.1 Change | % Visc 10 Change | % Tan Change | Visc 1000 poise | % Visc Change | Comment |
|---|---|---|---|---|---|---|---|---|---|---|
| C.S. A | 1.29E+05 | 1.64E+04 | 7.85 | 4.6044 | 0 | 0 | 0 | 4518.6 | 0 | 1 MI, Narrow MWD |
| Ex. 1 | 2.11E+05 | 1.78E+04 | 11.82 | 2.9446 | 63 | 8 | −36 | 4714 | 4 | 0.908 Density |
| Ex. 2 | 4.40E+05 | 1.86E+04 | 23.72 | 1.7186 | 241 | 13 | −63 | 4701.8 | 4 | |
| C.S. B | 7.15E+04 | 2.63E+04 | 2.72 | 33.027 | 0 | 0 | 0 | 4579.6 | 0 | 1.2 MI, Narrow MWD |
| Ex. 3 | 5.18E+05 | 2.66E+04 | 19.49 | 1.5901 | 625 | 1 | −95 | 4579.6 | 0 | 0.900 Density Butene |
| Ex. 4 | 1.65E+06 | 2.81E+04 | 58.85 | 0.7916 | 2214 | 7 | −98 | 4695.7 | 3 | |
| C.S. C | 9.25E+04 | 1.72E+04 | 5.38 | 9.0761 | 0 | 0 | 0 | 3969 | 0 | 1 MI, Broad MWD Heterogeneous 0.92 Density |
| Ex. 5 | 2.35E+05 | 1.68E+04 | 13.95 | 2.1441 | 153 | −2 | −76 | 4066.7 | 2 | |
| Ex. 6 | 6.92E+05 | 2.04E+04 | 33.97 | 1.2156 | 648 | 18 | −87 | 3859.1 | −3 | |
| C.S. D | 1.05E+05 | 1.92E+04 | 5.47 | 7.7074 | 0 | 0 | 0 | 4311 | 0 | 0.85 MI, Broad MWD 0.92 Density |
| Ex. 7 | 2.04E+05 | 1.63E+04 | 12.50 | 2.4803 | 94 | −15 | −68 | 4280.4 | −1 | |
| Ex. 8 | 4.35E+05 | 1.94E+04 | 22.46 | 1.5344 | 313 | 1 | −80 | 4072.8 | −6 | |

Summary of Melt Rheological Results in metric units (all viscosities in Pa-S (Pascal seconds))

| | Visc 0.1 Pa-S | Visc 100 Pa-S | Visc 0.1/100 | Tan 0.1 | % Visc 0.1 Change | % Visc 10 Change | % Tan Change | Visc 1000 Pa-S | % Visc Change | Comment |
|---|---|---|---|---|---|---|---|---|---|---|
| C.S. A | 1.29E+04 | 1.64E+03 | 7.85 | 4.6044 | 0 | 0 | 0 | 451.86 | 0 | 1 MI, Narrow MWD |
| Ex. 1 | 2.11E+04 | 1.78E+03 | 11.82 | 2.9446 | 63 | 8 | −36 | 471.4 | 4 | 0.908 Density |
| Ex. 2 | 4.40E+04 | 1.86E+03 | 23.72 | 1.7186 | 241 | 13 | −63 | 470.18 | 4 | |
| C.S. B | 7.15E+03 | 2.63E+03 | 2.72 | 33.027 | 0 | 0 | 0 | 457.96 | 0 | 1.2 MI, Narrow MWD |
| Ex. 3 | 5.18E+04 | 2.66E+03 | 19.49 | 1.5901 | 625 | 1 | −95 | 457.96 | 0 | 0.900 Density Butene |

TABLE 1-continued

| | | | | | | | | | |
|---|---|---|---|---|---|---|---|---|---|
| Ex. 4 | 1.65E+05 | 2.81E+03 | 58.85 | 0.7916 | 2214 | 7 | −98 | 469.57 | 3 | |
| C.S. C | 9.25E+03 | 1.72E+03 | 5.38 | 9.0761 | 0 | 0 | 0 | 396.9 | 0 | 1 MI, Broad MWD Heterogeneous |
| Ex. 5 | 2.35E+04 | 1.68E+03 | 13.95 | 2.1441 | 153 | −2 | −76 | 406.67 | 2 | 0.92 Density |
| Ex. 6 | 6.92E+04 | 2.04E+03 | 33.97 | 1.2156 | 648 | 18 | −87 | 385.91 | −3 | |
| C.S. D | 1.05E+04 | 1.92E+03 | 5.47 | 7.7074 | 0 | 0 | 0 | 431.1 | 0 | 0.85 MI, Broad MWD |
| Ex. 7 | 2.04E+04 | 1.63E+03 | 12.50 | 2.4803 | 94 | −15 | −68 | 428.04 | −1 | 0.92 Density |
| Ex. 8 | 4.35E+04 | 1.94E+03 | 22.46 | 1.5344 | 313 | 1 | −80 | 407.28 | −1 | |

Rheology modification efficiency is surprisingly influenced by the molecular weight distribution, molecular weight, type and amount of comonomer. The efficiency (based on percent change in viscosity at 0.1 rad shear rate) of the polymers tested decreases in the following order: Ex. 3&4, Ex. 5&6, Ex. 7&8, Ex. 1&2. Comparing examples coupled using 0.1 weight percent poly(sulfonyl azide), among the narrow molecular weight copolymers (Ex 4 and Ex 2) the ethylene butene copolymer (Ex 4) having 6.6 mole percent comonomer and Mw of 93,600 shows more change in viscosity than the ethylene-octene copolymer (Ex 2) having 6 mole percent comonomer (estimated) and Mw of 118,600. It is unexpected that the broad molecular weight ethylene octene copolymer (Ex 6) having 2.5 mole percent comonomer (estimated) and Mw of 114,800 would show more effect than the narrow molecular weight distribution polymer of Ex 2 having 6 mole percent comonomer and Mw of 118,600.

EXAMPLES 9 AND 10 AND COMPARATIVE SAMPLE E

Films

The resin used in these examples is an ethylene-octene copolymer with Mw/Mn=3.26, Mw=71100, having a melt index of 6 (g/10 min.), and a density of 0.919 g/cc commercially available from The Dow Chemical Company under the trade designation DOWLEX 2035 containing 200 ppm of Irganox 1010 antioxidant (previously identified) and 750 ppm of synthetic dihydrotalcite commercially available from Kyowa under the trade designation DHT 4A stabilizer referred to hereinafter by the trade designation.

To make compositions optimized for films, the amount of azide used is based on the final predicted melt index. The targeted melt index is I2=1.0 g/10 min as measured by ASTM 1238 Procedure A, so the needed amount of azide is 1200 ppm (parts per million by weight).

For example, the following data show the melt index (MI)(I2 and I10/I2) reduction for the addition of various amounts of azide:

| Polymer | Azide Amount (ppm) | I2 | I10/I2 |
|---|---|---|---|
| DOWLEX ™ 2035 | 0 | 6.0 | 7.6 |
| DOWLEX ™ 2035 | 500 | 3.2 | 10.2 |
| DOWLEX ™ 2035 | 1000 | 1.73 | 12.6 |
| DOWLEX ™ 2035 | 1500 | 0.62 | 20.9 |

From the data it is evident that as the amount of poly(sulfonyl azide) increases, the I10/I2 as measured by the procedure of ASTM 1238 (using 10 kg weight for I10 measurement) becomes higher and the resulting polymer has better processability as indicated by a high low shear viscosity for good melt strength and a low high shear viscosity so that the rate of polymer emitted from an orifice like that of an extruder (hereinafter "outout") is not sufficiently reduced to interfere with film formation, preferably not reduced from that of the starting material.

Sample Preparation

Resin Preparation for Examples 9 and 10 and Comparative Sample E

One hundred pounds (45.4 kg) of the DOWLEX 2035 resin pellets were tumble blended with 200 ml of mineral oil for 30 minutes in a 55 gallon (207.9 liter) fiber drum (with liner) for 2 hr at about 6 rotations per minute. A quantity corresponding to 1200 ppm of coupling agent was added to the resulting mixture and tumble blended for another 2 hours to ensure adequate coating of the pellets. The above procedure was repeated three times such that 300 pounds (136.2 kg) of coated resin were produced. After the dry blending, this admixture of coupling agent and resin was fed into a twin screw extruder having a screw diameter of 30 cm commercially available from Werner Pfleiderer Corporation under the trade designation ZSK-30 twin screw extruder. The extruder measured temperature was 130° C., 175° C., 215° C., 221° C., and 221° C. for zones 1, 2, 3, 4, and 5, respectively. The temperature was measured using thermocouples that are placed to the body of the barrel of the extruder. The distances of the thermocouples from the center of the feed zone are about 8.8, 38.8, 56.2, 66.3, 78.8, and 88.8 cm from the feed to the discharge (die) of the extruder for Zones 1, 2, 3, 4, and 5, respectively. The melt temperature and die temperatures were 230° C. and 220° C., respectively. The melt-extruded resin ran through a water cooling bath (at 19° C.) before it was pelletized. The output rate for this process was 30 pounds/hr (13.6 kg/hr). A total of 300 pounds (136.2 kg) of the coupled resin was collected for further study. The final resin (after treatment) had a measured 1.0 g/10 min melt index and 0.919 g/cc density.

For Comparative Samples E and G, the film was made directly from unmodified pellets of a homopolymer of ethylene having MI of 0.22 g/10 min, density of 0.921 g/cc commercially available from The Dow is Chemical Co. under the trade designation LDPE-132I which designation is used hereinafter for the polyethylene.

For Comparative Samples F and H, the film was prepared directly from the dry blend of pellets of 30 weight percent low density polyethylene (0.47 g/10 min MI, 0.9190 g/cc) commercially available from The Dow Chemical Co. under the trade designation LDPE-662I (containing 300 ppm Irganox 1010 antioxidant) which designation is used hereinafter for the polyethylene and 70 weight percent of a linear low density ethylene/octene copolymer (1.00 g/10 min MI, 0.920 g/cc density) commercially available from The Dow Chemical Co. under the trade designation DOWLEX LLDPE 2045 (containing the additives identified in Ex. 6) which designation is used hereinafter for the polyethylene. The resulting blend is used to provide a better balance of properties such as tear strength and melt strength than would be achieved by using LDPE 132I resin as one of the blend components.

Film Fabrication

Films were fabricated in a blown film extruder having a 2.5 inch (6.25 cm) single screw commercially available from Battenfeld Glouscester Engineering Inc. under the trade designation Model 22-01 using the detailed fabrication parameters as follows:

| | |
|---|---|
| Die gap: | 70 mil (1.75 mm) |
| Die type: | Sano |
| Die diameter: | 6 inches (15.2 cm) |
| Screw type: | Barr ET |
| Output rate: | 188 lb/h (85.1 kg/hr) |
| | (10 lb/hr/in die) |
| | (4.53 kg/hr/m die) |
| Melt Temp: | ~400° F. (204° C.) |
| Temperature profile: | 350° F., 425° F., 290° F., 290° F. |
| | (177° C., 218° C., 143° C., 143° C.) |
| Cooling Air: | yes |
| Blow up ratio: | 2.0 & 2.9 |
| Film gauge: | 6.0 mil (0.15 mm) |
| Shear at the die: | ~106 /s (metric unit) |

3000 ppm of $SiO_2$ was added as an antiblock to all of the resins, and 1000 ppm of polymer processing aid commercially available from 3M Co. under the trade designation Dynamar-5920 was added to all the resins except the 100 percent LDPEs (that is Comparative Sample E and F). The $SiO_2$ and Dynamar-5920 processing aid were dry-blended with the pellets; the additive blended pellets were then fed to the extruder to prepare the film.

Puncture at room temperature was measured using an instrument for the purposed commercially available from Instron Inc. under the trade designation Instron Model 4201 with a hardware upgrade commercially available from Sintech Inc. and a testing frame commercially available from Sintech Inc. under the trade designation MTS Sintech ReNew testing frame along with software commercially available from Sintech Inc. under the trade designation Sintech (Version 3.08) Testing Software. Four samples of each film with dimensions of 6"×6" (15×15 cm) were measured using a round specimen holder 12.56" (31.9 cm) square. A puncture probe is a ½" (1.27 cm) polished stainless steel ball with 7.5" (18.75 cm) maximum travel and travel speed of 10'" /min (25.4 cm/min). The energy required to break the film was measured.

Elmendorf Tear Strength is measured at 23° C. according to the procedures of ASTM D1922. MD (Machine Direction) Ult (ultimate) Tensile Strength and CD (Cross Direction) Ult Tensile Strength are measured according to the procedures of ASTM D638.

Results of these measurements are shown in Table 1:

TABLE 1

Mechanical Properties of Film

| Properties of Film | Ex 9 100% DOWLEX 2035 1250 ppm Azide (2.0)* | Std Dev | C.S E 100% 132I (2.0)* | Std Dev | C.S. F 30% 662I 70% DOWLEX 2045 (2.0)* | Std Dev | Ex. 10 100% DOWLEX 2035 1250 ppm Azide (2.9)* | Std Dev | C.S.G 100% 132I (2.9)* | Std Dev | C.S. H 30% 662I 70% DOWLEX 2045 (2.9)* | Std Dev |
|---|---|---|---|---|---|---|---|---|---|---|---|---|
| Extruder Pressure (psi) | 1720 | | 2700 | | 3670 | | 1720 | | 2690 | | 3620 | |
| Elmendorf Tear Strength (23° C.) (ASTM D1922) | | | | | | | | | | | | |
| MD Tear Strength (g) | 1104.00 | 147.00 | 714.20 | 157.50 | 1233.90 | 46.80 | 1384.30 | 85.80 | 281.30 | 19.40 | 1779.20 | 89.40 |
| CD Tear Strength (g) | 2060.80 | 94.90 | 823.70 | 21.10 | 755.20 | 17.50 | 1900.80 | 86.50 | 671.70 | 34.70 | 2668.80 | 66.40 |
| Puncture at Room Temp. Energy to Break (in-lb) | 35 | 2 | 18 | 7 | 67 | 8 | 44 | 4 | 33 | 2 | 56 | 5 |
| MD Ult Tensile Strength (psi) ASTM D638 | 3530 | 524 | 3010 | 374 | 3650 | 944 | 3410 | 670 | 2870 | 383 | 4570 | 762 |
| MD Elongation at Break (%) | 740 | 73 | 360 | 88 | 650 | 120 | 740 | 97 | 470 | 73 | 750 | 81 |
| MD Tensile Yield (psi) | 1480 | 26 | 1580 | 24 | 1570 | 12 | 1480 | 32 | 1480 | 178 | 1630 | 15 |
| CD Ult Tensile Strength (psi) ASTM D638 | 3480 | 345 | 2780 | 354 | 4410 | 313 | 3540 | 496 | 2580 | 447 | 4570 | 941 |
| CD Elongation at Break (%) | 760 | 52 | 620 | 70 | 780 | 31 | 750 | 68 | 490 | 75 | 760 | 99 |
| CD Tensile Yield (psi) | 1610 | 9 | 1750 | 18 | 1850 | 37 | 1540 | 18 | 1600 | 11 | 1740 | 22 |
| Haze (%) (ASTM D1003) | 27.2 | 0.1 | 15.1 | 0.2 | 31.6 | 0.3 | 22.0 | 0.3 | 13.1 | 0.3 | 30.5 | 0.2 |

*Blow up Ratio
CD and MD are Cross Direction and Machine Direction orientation of the film

TABLE 2

Metric conversions of measurements

| Properties of Film | Ex 9 100% DOWLEX 2035 1250 ppm Azide (2.0)* | metric conversion | C.S E 100% LDPE 132I (2.0)* | metric conversion | C.S. F 30% LDPE 662I 70% DOWLEX 2045 (2.0)* | metric conversion | Ex. 10 100% DOWLEX 2035 1250 ppm Azide (2.9)* | metric conversion | C.S. G 100% LDPE 132I (2.9)* | metric conversion | C.S. H 30% LDPE 662I 70% DOWLEX 2045 (2.9)* | metric conversion |
|---|---|---|---|---|---|---|---|---|---|---|---|---|
| Extruder Pressure (psi) Mpa | 1720 | 11.86 | 2700 | 18.61 | 3670 | 25.3 | 1720 | 11.86 | 2690 | 18.55 | 3620 | 24.96 |
| Elmendorf Tear Strength (23° C.) (ASTM D1922) | | | | | | | | | | | | |
| MD Tear Strength (g) | 1104.00 | same | 714.20 | | 1233.90 | | 1384.30 | | 281.30 | | 1779.20 | |
| CD Tear Strength (g) | 2060.80 | | 823.70 | | 755.20 | | 1900.80 | | 671.70 | | 2668.80 | |
| Puncture at Room Temp. Energy to Break (in-lb) (cm/kg) | 35 | 40.25 | 18 | 20.7 | 67 | 77.05 | 44 | 50.6 | 33 | 37.95 | 56 | 64.4 |
| MD Ult Tensile Strength (psi) ASTM D638 | 3530 | 24.33 | 3010 | 20.75 | 3650 | 25.17 | 3410 | 23.51 | 2870 | 19.79 | 4570 | 31.51 |
| MD Elongation at Break (%) | 740 | | 360 | | 650 | | 740 | | 470 | | 750 | |
| MD Tensile Yield (psi) Mpa | 1480 | 10.20 | 1580 | 10.89 | 1570 | 10.82 | 1480 | 10.20 | 1480 | 10.20 | 1630 | 11.23 |
| CD Ult Tensile Strength (psi) ASTM D638 | 3480 | 23.99 | 2780 | 19.16 | 4410 | 30.41 | 3540 | 24.4 | 2580 | 17.79 | 4570 | 31.51 |
| CD Elongation at Break (%) | 760 | | 620 | | 780 | | 750 | | 490 | | 760 | |
| CD Tensile Yield (psi) Mpa | 1610 | 11.10 | 1750 | 12.06 | 1850 | 12.75 | 1540 | 10.6 | 1600 | 11.03 | 1740 | 11.99 |
| Haze (%) (ASTM D1003) | 27.2 | | 15.1 | | 31.6 | | 22.0 | | 13.1 | | 30.5 | |

*Blow up Ratio

As compared to the film of Comparative Sample E, the film of Example 9 exhibits much better mechanical properties such as tear strength and puncture resistance. It also has acceptable processability as shown by the lower extruder pressures as compared with that of Comparative Sample E. Good bubble stability was observed as was good quality film as indicated by visual observation. (A stable bubble does not waver or pump up and down causing film thickness variation. The bubble also does not sit down on the die when stable.) Comparative Sample F is the blend of LDPE and LLDPE to achieve better physical properties; while this blend provides better mechanical performance compared to a single resin alone, as indicated by tear strength and energy to break, the processability is decreased by the additional of the LLDPE (i.e. it requires very high extruder pressures, 3670 psi (25300 kPa)). This is not advantageous to production of thick blown films.

Example 10 shows that the coupled Dowlex 2035 LLDPE resin can be blown at very high blow up ratios (2.9). This is significant in that it allows the film to be made into very wide lay flats for greenhouse and agricultural films. The physical properties of the film of Example 9 compared to that of Comparative Sample G are far superior in tear strength and puncture resistance. The film of Example 10 has lower die pressure than Comparative Sample H indicating that Example 10 should have higher output than Comparative Sample H.

What is claimed is:

1. A composition comprising a rheology modified, coupled polymer reaction product formed by heating an admixture the admixture comprising (1) at least one ethylene polymer or blend of ethylene polymers having a density of at least about 0.89 g/mL and less than about 0.935 g/mL and a comonomer content between about 0.5 and 50 weight percent of an alpha olefin having greater than 2 and less than 20 carbon atoms per molecule (comonomer based on total copolymer) and (2) a coupling amount of from 0.01 to about 5 weight percent of polymers in the admixture of at least one poly(sulfonyl azide) to at least the decomposition temperature of the poly(sulfonyl azide) for a period sufficient for decomposition of at least about 80 weight percent of the poly(sulfonyl azide), wherein coupling is indicated by a viscosity change at a shear frequency of 0.1 rad/sec of greater than 5%.

2. The composition of claim 1 wherein at least one ethylene polymer is a ethylene copolymer having a comonomer selected from octene, hexene, propylene, butene, and combinations thereof.

3. The composition of claim 1 wherein at least one ethylene polymer has a molecular weight distribution less than about 3.

4. An article which is a film of the composition of claim 1.

5. The article of claim 4 wherein the film has a thickness of at least about 6 mils (3.15 mm).

6. The article of claim 4 which is a trash bag, grocery sack, sealant layer, tie layer, produce bags, garment bag, shipping sack, medical film, stretch film, shrink film, agricultural film, construction film, geomembrane, greenhouse film, or stretch hooder.

7. The article of claim 4 which is calendared.

8. The composition of claim 1 which has a gel content less than about 1 percent by weight.

\* \* \* \* \*